US008660481B2

(12) United States Patent
Miller (10) Patent No.: US 8,660,481 B2
(45) Date of Patent: Feb. 25, 2014

(54) TECHNIQUES FOR PROVIDING BROADCAST SERVICES ON SPOT BEAM SATELLITES (75) Inventor: Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 1390 days.

(21) Appl. No.: 12/052,339

(22) Filed: Mar. 20, 2008

(65) Prior Publication Data
US 2008/0233952 A1 Sep. 25, 2008

Related U.S. Application Data (60) Provisional application No. 60/896,044, filed on Mar. 21, 2007.

(51) Int. Cl.
H04B 7/204 (2006.01)
H04B 7/212 (2006.01)
H04B 7/216 (2006.01)

(52) U.S. Cl.
USPC ........ 455/12.1; 455/13.1; 455/13.3; 370/316; 370/319; 370/320; 370/321

(58) Field of Classification Search
USPC .................................. 455/428, 504
See application file for complete search history.

(56) References Cited

U.S. PATENT DOCUMENTS

| 5,669,062 | A | 9/1997 | Olds et al. |
| 6,594,469 | B1 | 7/2003 | Serri et al. |
| 6,975,600 | B1 | 12/2005 | Vaughan et al. |
| 2001/0045494 | A1 | 11/2001 | Higgins |
| 2003/0054816 | A1* | 3/2003 | Krebs et al. ................... 455/428 |
| 2003/0207684 | A1 | 11/2003 | Wesel |
| 2004/0092227 | A1 | 5/2004 | Sarraf et al. |
| 2004/0252229 | A1* | 12/2004 | Jiang et al. .................. 348/385.1 |
| 2006/0258303 | A1 | 11/2006 | Taira et al. |
| 2007/0022352 | A1* | 1/2007 | Eroz et al. ..................... 714/752 |
| 2007/0184849 | A1* | 8/2007 | Zheng ......................... 455/456.1 |

FOREIGN PATENT DOCUMENTS

| CN | 1768488 A | 5/2006 |
| EP | 0910180 A2 | 4/1999 |
| WO | WO 01/67637 A1 | 9/2001 |
| WO | WO 2006/113008 A1 | 10/2006 |

OTHER PUBLICATIONS

International Search Report and Written Opinion for PCT Patent Application No. PCT/US2008/57672 mailed on Jun. 23, 2008, 6 pages.
Communication dated Jul. 28, 2011 and Supplementary Search Report for EP Patent Application No. EP08732577, 8 pages.

* cited by examiner

Primary Examiner — Mahendra Patel
Assistant Examiner — Joshua Schwartz
(74) Attorney, Agent, or Firm — Kilpatrick Townsend & Stockton LLP (57) ABSTRACT Techniques for providing broadcast services on spot beam satellite are provided. These techniques enable the mission of a spot beam satellite system to be changed from providing spot beam transmission to broadcast transmissions, and vice versa, without requiring that the satellite be reconfigured. Broadcast data may be encoded and transmitted concurrently on a plurality of spot beams. According to some embodiments, the broadcast data may be encoded using a space-time code and/or forward error corrected (FEC) encoded to enable a receiver to correct errors in the signal received from the spot beam satellite.

8 Claims, 4 Drawing Sheets

TECHNIQUES FOR PROVIDING BROADCAST SERVICES ON SPOT BEAM SATELLITES

CROSS-REFERENCES TO RELATED APPLICATIONS

This application claims the benefit of U.S. Provisional No. 60/896,044, filed on Mar. 21, 2007, the full disclosure of which is incorporated herein by reference.

BACKGROUND OF THE INVENTION

Spot beams satellites have become common on the Ka band and Mobile Satellite Services (MSS) bands (S band and L band). The Ka band, the L band and the S band are portions of the microwave band of the electromagnetic spectrum. The Ka band ranges from approximately 18 to 40 GHz, the L-band ranges from approximately 1 to 2 GHz, and the S-band ranges from approximately 2 to 4 GHz.

Spot beam satellites produce signals that are concentrated on a limited geographical area. Spot beams are typically used where a content provider wishes to restrict content to an intended reception area. Only receivers within the limited geographical area covered by the spot beam are able to receive the content. Spot beam satellites may be used to transmit a variety of content, such as audio and video content. For example, satellite television providers may use spot beam satellites to provide localized content to subscribers in different cities.

Due to the confined nature of the signals produced by each spot beam, spot beam satellites facilitate frequency reuse. Multiple beams from one or more satellites may use the same frequency to transmit different data without interfering with one another, so long as each beam is focused on a different geographical area. As a result, receiver design may also be simplified in spot beam systems, as the receiver does not require logic for distinguishing data received from multiple transmitters on the same frequency. For example, returning to the satellite television example described above, a satellite television provider can transmit content to localized content to different cities using the same frequency. Each city would be covered by spot beams providing localized content for that city and subscribers in each city would be able to receive the content on the same frequency. Thus, the satellite television provider could provide receivers configured to receive on the same frequency regardless of the geographical location of the subscriber.

In contrast to spot beam satellites, broadcast satellites produce a single large beam that covers a wide geographical area. Broadcast satellites are typically used to provide the same content to a large number of users distributed over vast geographical areas, such as the continental United States (CONUS). Broadcast satellites, like spot beam satellites, may be used to transmit a variety of content, such as broadcast audio and video.

A typical satellite has a functional lifetime of approximately 15 years and requires a large investment in resource in order to construct, place in orbit, and maintain the satellite. Accordingly, systems and method that enable the mission of a spot beam satellite to be changed from spot beam transmission to broadcast transmission, and vice versa, without requiring that the satellite be reconfigured are desired.

BRIEF SUMMARY OF THE INVENTION

Techniques for providing broadcast services on a spot beam satellite are provided. Embodiments also enable the mission of a spot beam satellite system to be changed from providing spot beam transmission to broadcast transmissions, and vice versa, without requiring that the satellite be reconfigured.

According to an embodiment, a satellite system for providing broadcast service is provided. The satellite system includes a spot beam satellite operable in a first mode to provide broadcast data to a broadcast coverage area via a plurality of spot beams, the broadcast coverage area comprising a plurality of spot beam coverage areas. The satellite is also operable in a second model to provide spot beam transmission to the plurality of spot beam coverage areas. According to some embodiments, when the satellite is operating in the first mode, the broadcast data is space-time encoded and each spot beam transmits the broadcast data using the same frequency.

According to another embodiment, a broadcast signal source for providing broadcast data to a spot beam satellite broadcasting system is provided. The broadcast signal source includes a transmitter configured to transmit a plurality of uplink signals to a spot beam satellite. Each of the uplink signals corresponds to a spot beam of the spot beam satellite. The broadcast signal source also includes a data encoder module for encoding the broadcast data such that the spot beam satellite may simultaneously broadcast the encoded data on at least a portion of the plurality of spot beams using the same frequency. According to some embodiments, the data encoder encodes the broadcast data using a space-time code.

According to yet another embodiment, a method for broadcasting data using a spot beam satellite system is provided. The method includes encoding the broadcast data to provide a plurality of encoded data signals and broadcasting the data using the plurality of spot-beams of the spot beam satellite. Each of the plurality of encoded data signals corresponds to one of a plurality of spot beams of a spot-beam satellite. The data is encoded such that the spot beam satellite may simultaneously broadcast the encoded data on at least a portion of the plurality of spot beams using the same frequency on each of the spot beams. According to an embodiment, encoding the broadcast data includes encoding the broadcast data using a space-time code to produce a plurality of encoded outputs, and each of the encoded outputs corresponds to a spot beam of the spot beam satellite.

Other features and advantages of the invention will be apparent in view of the following detailed description and preferred embodiments.

BRIEF DESCRIPTION OF THE DRAWINGS

Embodiments of the invention are described here, with reference to the figures. Where elements of the figures are called out with reference numbers, it should be understood that like reference numbers refer to like elements and might or might not be the same instance of the element.

DETAILED DESCRIPTION OF THE INVENTION

Embodiments of the present invention advantageously provide systems and methods for providing broadcast services on spot beam satellites. Embodiments advantageously provide a flexible solution with satellites that may be reconfigured for either wide-beam or spot-beam transmissions using spot beam satellites.

Embodiments advantageously combine space-time coded transmissions with spot beam satellite communications to distribute broadcast content over a wide geographical region using a spot beam satellite system. In a specific embodiment, a satellite broadcast system comprises N spot beams and a space-time encoder with N outputs. Each of the N space-time encoder outputs is transmitted simultaneously on different spot beams using the same frequency. Spot beam coverage areas may be contiguous geographical locations. Each user terminal may receive the broadcast signal from a plurality of spot beams at widely varying receive signal power levels, and the user terminal performs space-time decoding to decode the broadcast content without interference from adjacent or nearby beams.

Figure 1:
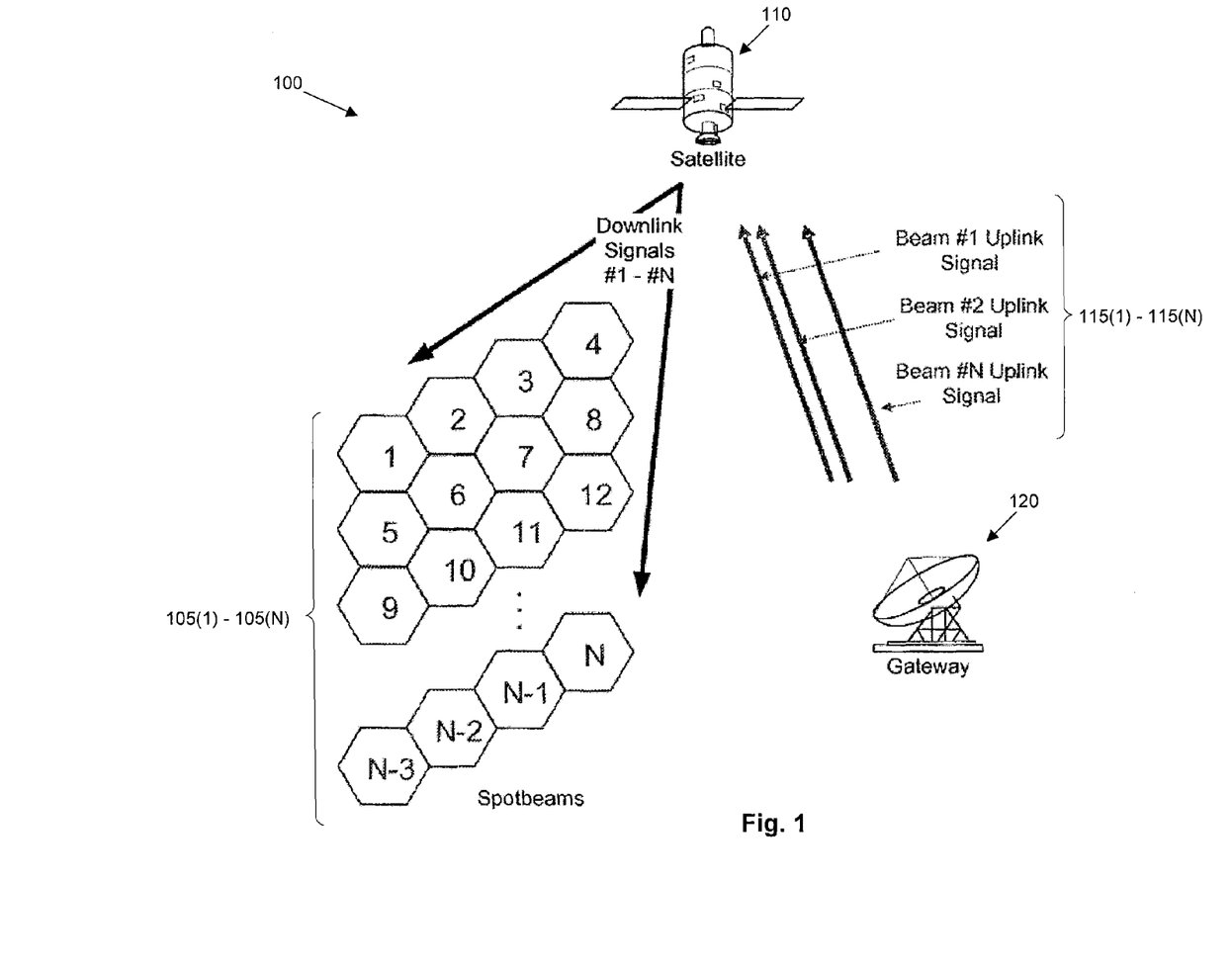
FIG. 1 is an illustration of a spot beam satellite system providing broadcast coverage from a single satellite according to an embodiment of the present invention.

FIG. 1 is an illustration of a spot beam satellite system 100 providing broadcast coverage from a single satellite 110 according to an embodiment. Satellite 110 transmits a plurality of spot beams with each of the spot beams providing coverage over a limited geographical area. Satellite 110 is configured to use the same frequency for a number of beams in the intended coverage area.

Spot beam coverage areas 105(1)-105(N) together comprise some or all of the broadcast coverage area for satellite 110. As illustrated in FIG. 1, spot beam coverage areas 105(1)-105(N) may advantageously comprise contiguous geographical areas using the same or overlapping frequency bands, unlike conventional spot beam broadcasts where spot beam transmissions to coverage areas comprising contiguous geographical areas may result in signal interference from adjacent or nearby beams on the same frequency.

Gateway 120 comprises a space-time encoder (not pictured) that is configured to use a space-time code (STC) to encode the broadcast data. The STC encoder is configured to have N outputs, one for each of the N beams. Each output is separately modulated on its own carrier using a modulation such as MPSK and QAM. One skilled in the art will recognize that other modulation techniques may also be used.

According to an embodiment of the present invention, the N modulators are run synchronously so that the N output signals on each of the N spot beams are symbol synchronized. The synchronization of the modulators is easier if all of the modulators reside in the same physical location. However, according to some embodiments of the present invention, at least a portion of the modulators may reside at different physical locations and various techniques, such as using a synchronization signal, may be used to synchronize the modulators.

The output of each of the modulators is up-converted and transmitted to satellite 110 via beam uplink signals 115(1)-115(N). Each beam uplink signal corresponds to one of the N spot beams 105(1)-105(N). Satellite 110 receives beam uplink signals 115(1)-115(N) and retransmits the signals received as downlink signals via spot beams 105(1)-105(N). The downlink signals 105(1)-105(N) occupy the same frequency and the downlink signals at least partially overlap in time. Satellite 110 transmits broadcast data on the same frequency on each of the beams in the intended coverage area, and because the broadcast signals are space-time encoded, signals from adjacent and/or nearby spot beams will not cause interference at receivers within the coverage area of a particular spot beam.

According to some embodiments, satellite 110 is a bent pipe satellite that retransmits broadcast data received from a broadcast signal source, such as gateway 120. However, according to other embodiments, satellite 110 may perform additional processing on the broadcast data prior to retransmission, such as frequency translation and/or signal amplification.

Figure 2:
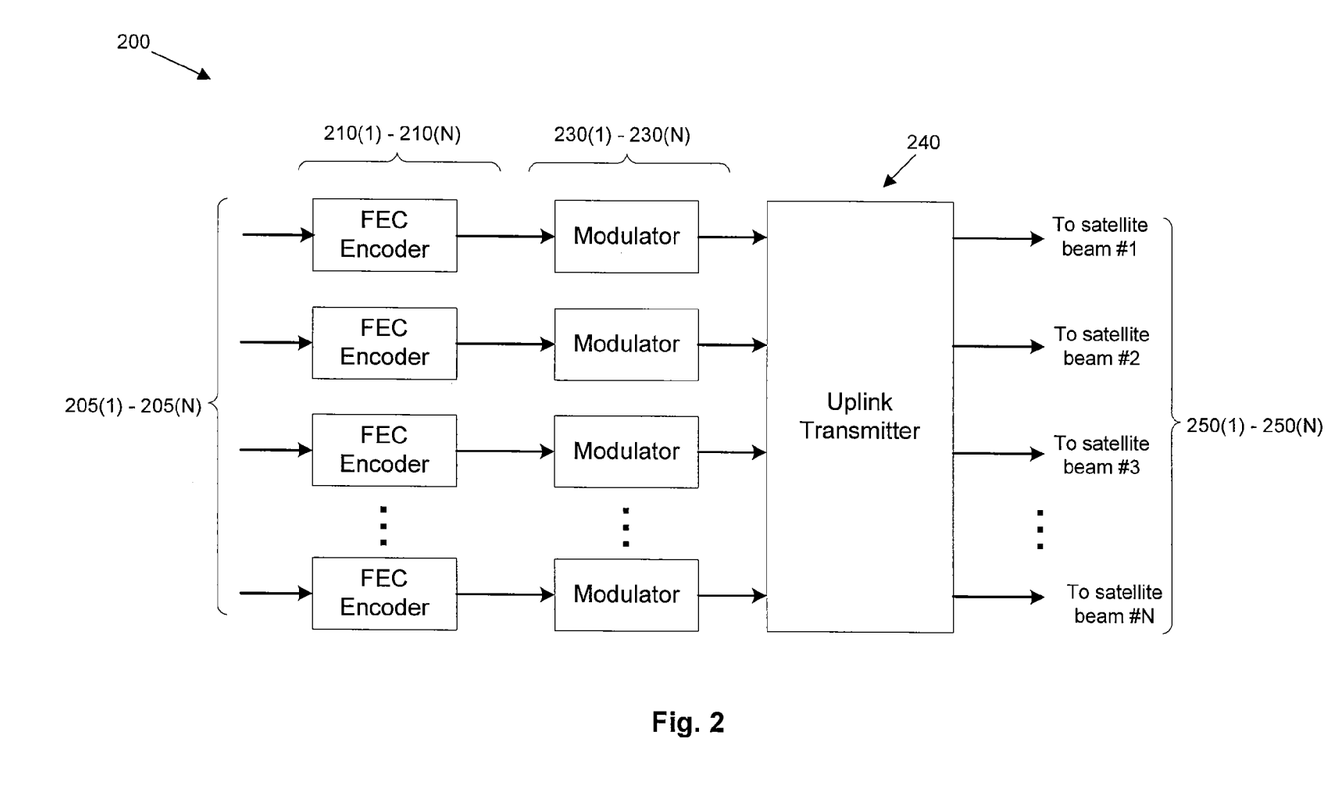
FIG. 2 is a block diagram of a conventional encoder for encoding broadcast data for a spot beam broadcast satellite system.

FIG. 2 is a block diagram of a conventional encoder 200 for encoding broadcast data for a spot beam broadcast satellite system. Conventional encoder 200 includes FEC encoders 210(1) through 210(N), modulators 230(1)-230(N), and uplink transmitter 240. Conventional encoder 200 requires that spot beams having nearby or adjacent coverage areas transmit on different frequencies or at different time intervals if the using the same frequencies. Otherwise, if spot beams with nearby or adjacent coverage areas transmit on the same frequencies at the same time, the signals from nearby or adjacent beams are likely to cause interference at receivers within the coverage areas of the adjacent or nearby beams.

Conventional encoder 200 receives broadcast input signals 205(1)-205(N) comprising the content to be broadcast by the plurality of spot beams of a spot beam satellite. Forward Error Correction (FEC) encoder modules 210(1)-210(N) each receive broadcast input signals 205(1) through 205(N) and perform FEC encoding on the input signal. FEC encoding adds additional redundant data to the signal that enables a receiver to detect and correct some errors in the signal received from the satellite system.

FEC encoder modules 210(1)-210(N) outputs an FEC encoded signal and the encoded signal is input to one of modulator modules 230(1)-230(N). Modulator modules 230(1)-230(N) modulate the encoded signals received as inputs on separate carriers and output the modulated signals. Various modulation techniques such as M-ary Phase Key Shifting (MPSK) or quadrature amplitude modulation (QAM) may be used. One skilled in the art will recognize that other modulation techniques may also be used.

Uplink transmitter 240 receives each of the modulated signals output by modulator modules 230(1) through 230(N). Uplink transmitter 240 transmits a separate uplink signal 250(1) through 250(N) to a satellite, with each uplink signal corresponding to a different spot beam.

Conventional encoder 200 may implement a conventional four-color unicast approach that is commonly used in spot beam satellite systems. According to the four-color unicast approach, the satellite bandwidth is partitioned into four disjoint frequency segments with each of the segments equal to one quarter of the bandwidth of the total frequency allocation. Sometimes separate antenna polarization is used to double the available frequency allocation. Thus, transmissions for each spot beam are confined to only a subset of the bandwidth available to the satellite.

Figure 3:
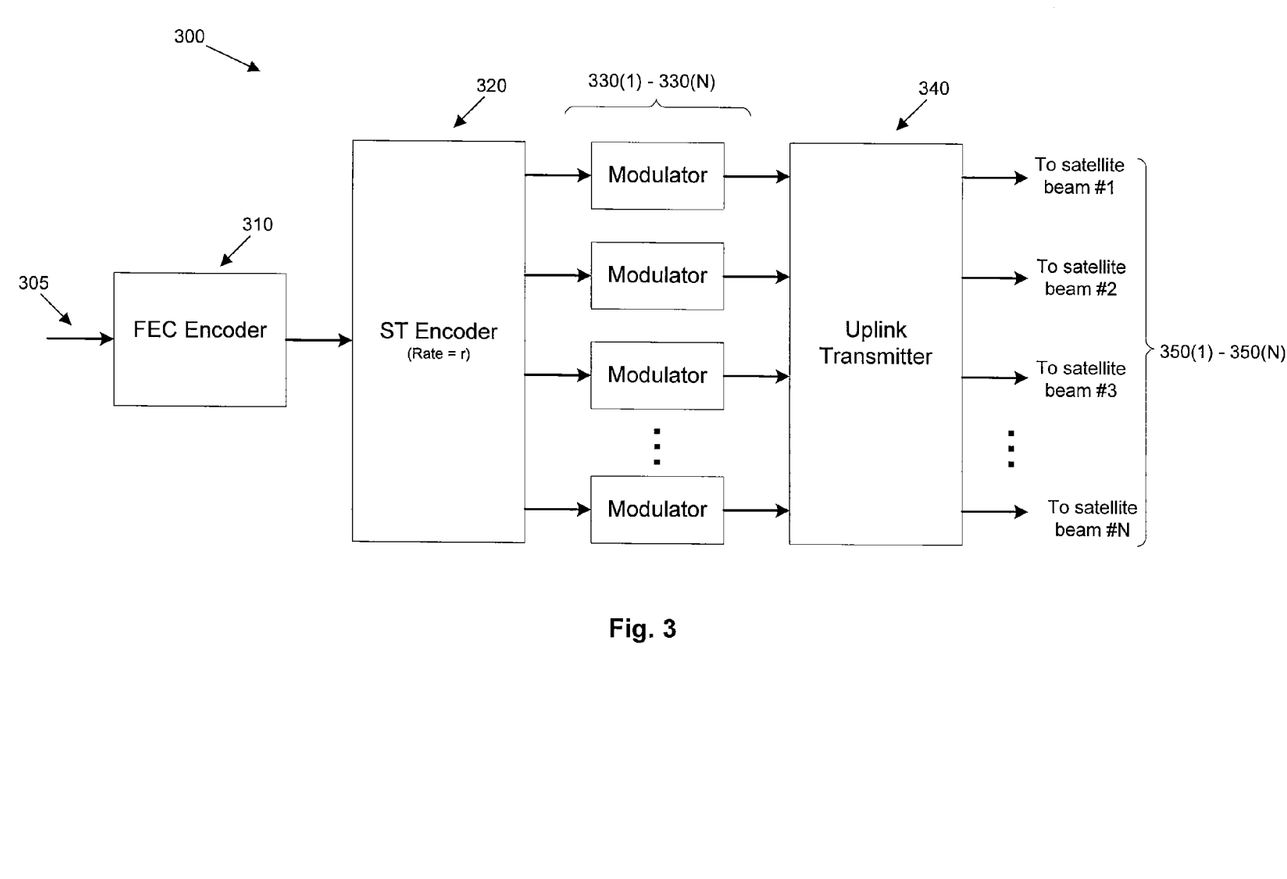
FIG. 3 is a block diagram of a space-time encoder for encoding broadcast data for a spot beam broadcast satellite system according to an embodiment of the present invention.

FIG. 3 is a block diagram of a space-time encoder for encoding broadcast data for a spot beam broadcast satellite system according to an embodiment. Space-time encoder 300 includes FEC encoder 310, ST encoder 320, modulators 330(1)-330(N), and uplink transmitter 340. Space-time encoder 300 advantageously enables signals from all of the spot beams to transmit on the same frequency at the same time without signals from nearby or adjacent beams causing interference at receivers with a particular spot beam's coverage area.

Space-time encoder 300 advantageously provides more bandwidth for signal transmission than the conventional four-color unicast approach that is commonly used in spot beam satellite systems (described above). In contrast, embodiments of the present invention enable each spot beam to transmit using the full bandwidth available to the satellite.

Space-time encoder 300 also advantageously eliminates spot-beam interference, which commonly occurs as a side effect in unicast systems that include frequency reuse. According to embodiments, the broadcast signals transmitted on the plurality of spot beams of the satellite system are encoded to avoid interference from adjacent and/or nearby beams.

Space time encoder 300 receives a broadcast input signal 305 comprising the content to be broadcast by the plurality of spot beams of a spot beam satellite, such as spot beam satellite 110 described above. Forward Error Correction (FEC) encoder module 310 receives broadcast input signal 305 and performs FEC encoding on the input signal. FEC encoding adds additional redundant data to the signal that enables a receiver to detect and correct some errors in the signal received from the satellite system. Retransmission of data to individual receivers would be impractical in a broadcast satellite communication system, such as the modified spot beam satellite communication system of the subject invention, because the same data is concurrently broadcast by a plurality of spot beams and the spot beam coverage area of each spot beam may include a plurality of receivers. By FEC encoding the broadcast data, the system provides receivers with the ability to correct at least some errors in the received signal.

FEC encoder module 310 outputs an FEC encoded signal and the encoded signal is input to space-time (ST) encoder module 320. ST encoder module 320 applies a space-time code to the FEC encoded data. ST encoder module 320 may use various space-time codes such as the Alamouti code, described below.

ST encoder module 320 produces N outputs, each of the N outputs corresponding to one of the N spot beams of the spot beam satellite. Space time encoder 300 includes N modulator modules, modulator modules 330(1)-330(N), with each of the modulator modules corresponding to one of the N spot beams of the satellite. Modulator modules 330(1)-330(N) each receive one of the N outputs from ST encoder module 320. Modulator modules 330(1)-330(N) modulate the encoded signals received as inputs on separate carriers and output the modulated signals. Various modulation techniques such as M-ary Phase Key Shifting (MPSK) or quadrature amplitude modulation (QAM) may be used. One skilled in the art will recognize that other modulation techniques may also be used.

Uplink transmitter 340 receives each of the modulated signals output by modulator modules 330(1) through 330(N). Uplink transmitter 340 transmits a separate uplink signal 350(1) through 350(N) to satellite 110. Uplink signals 330(1) through 330(N) each correspond to a separate spot beam coverage area of spot beam coverage areas 105(1) through 105(N) illustrated in FIG. 1.

Figure 4:
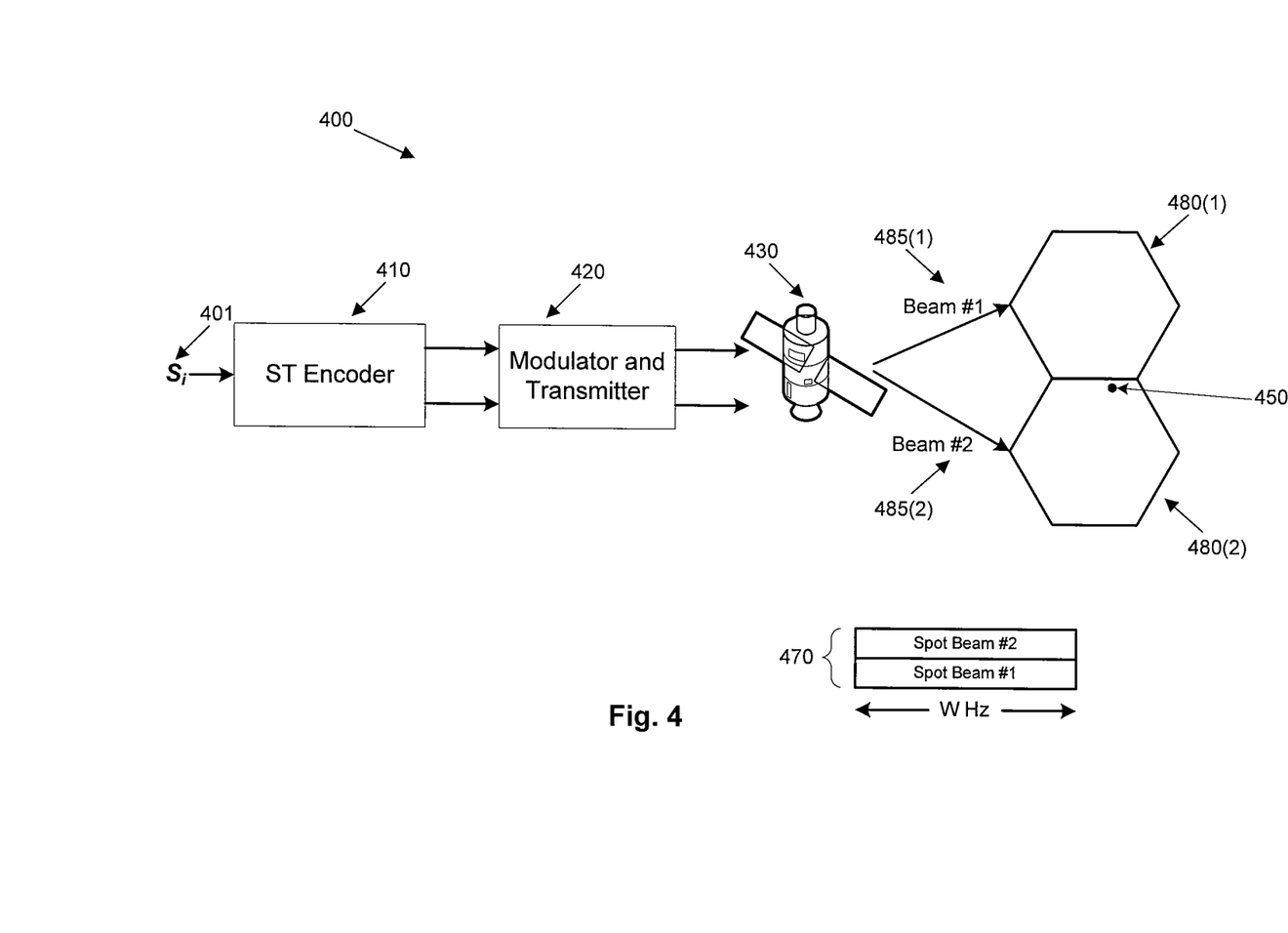
FIG. 4 is another illustration of a spot beam satellite system providing broadcast coverage from spot beam satellite according to an embodiment of the present invention.

FIG. 4 is another illustration of a spot beam satellite system 400 providing broadcast coverage from spot beam satellite according to an embodiment. Spot beam satellite system 400 comprises satellite 430 that includes two spot beams providing broadcast coverage to two spot beam coverage areas 480(1) and 480(2). One skilled in the art will recognize that other embodiments may include spot beam satellite systems that include satellites that provide more than two spot beams.

ST encoder 410 uses the Alamouti code as the space-time coding method for encoding broadcast input signal 401. Broadcast input signal 401 includes the content to be broadcast to receivers within spot beam coverage areas 480(1) and 480(2). ST encoder 410 outputs two encoded signals, one signal for each of the beams. The outputs from ST encoder 410 are input into modulator and transmitter module 420. Modulator and transmitter module 420 performs similar functions as modulators 330(1)-330(N) and uplink transmitter 340 described above. Modulator and transmitter module 420 modulates the space-time coded signals received from ST encoder module 410 and transmits an uplink signal corresponding to each beam to satellite 430. Satellite 430 receives the uplink signals and retransmits the data in the uplink signals as downlink signals on each of the two beams. Bandwidth utilization map 470 illustrates that beams 1 and 2 are both able to simultaneously utilize the full bandwidth of W Hz available to satellite 430.

ST encoder 410 employs the Alamouti code, which is designed for a two antenna transmitter system. One skilled in the art will recognize that other space-time coding method may be used in other embodiments. The Alamouti code is a rate-1 code, meaning that it will take two timeslots to transmit two symbols in a block S1 and S2. Symbols S1 and S2 represent complex valued coordinates for a particular M-ary QAM, PSK, or amplitude phase-shift keying (APSK) constellation (of which, binary phase-shift-keying (BPSK), Quadrature Phase Shift Keying (QPSK), and 8 Phase Shift Keying (8-PSK) are special cases).

At the first symbol transmission interval, the signal transmitted to first beam 485(1) will be $S_1$ and the signal transmitted to second beam 485(2) will be $S_2$. During the second signaling interval in the block of 2, the signal transmitted to first beam 485(1) will be $-S2^*$ and the symbol transmitted to second beam 485(1) will be $S1^*$ where * indicates complex conjugation.

User Terminal (UT) 450 is located within the footprint of second beam 485(2) but near the edge of beam 485(1). However, since the downlink signals 485(1) and 485(2) occupy the same bandwidth at the same time, the signal received by UT 450 will have contributions from both beam signals. Specifically, the signal out of the matched filters in the UT sampled at the optimal time is:

First Symbol: $r_1 = h_1 S_1 + h_2 S_2 + N_1$ (equation 1)

Second Symbol: $r_2 = -h_1 S^*_2 + h_2 S^*_1 + N_2$ (equation 2)

where $h_1$ and $h_2$ are assumed to be constant over a two symbol period and $h_1$ and $h_2$ represent the channel gain from each of the two beams to the UT, and $N_1$ and $N_2$ are additive white Gaussian Noise (AWGN). The channel gains consist of a magnitude and a phase, $h_1 = \alpha_1 e^{j\Theta_1}$ and $h_2 = \alpha_2 e^{j\Theta_2}$. The received power from each beam is proportional to $\alpha_1$ and $\alpha_2$, respectively. The magnitude of the channel gains $\alpha_1$ and $\alpha_2$ depend on the location of the UT within the coverage area comprising the footprint of the first and second beams.

For a UT near the center of first beam 485(1), $\alpha_1$ will be large and $\alpha_2$ will be small. For a UT in near the center of second beam 485(2), $\alpha_2$ will be large and $\alpha_1$ will be small. For UT's near the edge that borders both beams, the beam crossover points, both $\alpha_1$ and $\alpha_2$ will be about the same value and smaller, sometimes significantly smaller, than the peak values that occur at the center of the beams. Beam rolloff may be to be 3 dB or more at the beam crossover points. In spot beam unicast systems, UT locations at the beam crossover points are typically the worst locations for spot beam unicast traffic. However, embodiments of the spot broadcast satellite system advantageously overcome this problem, enabling the system to broadcast content to contiguous spot beam coverage areas using the same frequency without experiencing loss of signal quality for UTs in or near beam crossover points.

Within the UT, space-time decoding is performed by multiplying the received signals by the channel gains, which in the present embodiment, must be known to the decoder, $$\hat{S}_1 = h^*_1 r_1 + h_2 r^*_2 = (\alpha_1^2 + \alpha_2^2) S_1 + h^*_1 N_1 + h_2 N^*_2 \quad \text{(equation 3)}$$

$$\hat{S}_2 = h^*_2 r_1 - h_1 r^*_2 = (\alpha_1^2 + \alpha_2^2) S_2 + h^*_2 N_1 - h_1 N^*_2 \quad \text{(equation 4)}$$

As demonstrated in equations 3 and 4 above, the ideal decoder output according to embodiments of the present invention has the two transmitted symbols completely separated so there is no beam interference. Furthermore, the received energy in each of the decoded outputs is proportional to the sum of the received energy from first beam 485(1) and second beam 485(2). This property, referred to a diversity gain, advantageously enables UTs located at beam crossover points to operate without experiencing energy loss due to beam rolloff. Also, the variation of the signal-to-noise ratio (SNR) also may be advantageously reduced. Reducing variations in the SNR of a broadcast channel may also increase the capacity of the broadcast channel, enabling better quality communication because the capacity of a broadcast channel may be defined by the SNR of UTs that fall within worst case locations within the coverage area, such as the beam crossover points.

Spot beam satellite system 400 described above includes an orthogonal space-time code of rate=1 and N=2 outputs. One skilled in the art will recognize that other embodiments may be implemented using other orthogonal codes or other non-orthogonal codes.

The use of orthogonal codes in spot beam broadcast satellite systems provide a number of advantages. These benefits include, but are not limited to (1) no spot beam interference, and (2) the decoded signal energy is proportional to the sum of the channel gains (magnitude squared) for all spot beams. Another advantage of incorporating orthogonal codes into embodiments of the spot broadcast satellite system is that the decoding process for orthogonal codes is relatively simple and results in soft outputs. The soft outputs from the orthogonal decoder may then be input into a space-time decoder. The soft outputs also enable powerful forward error correction (FEC) techniques to be applied to the signal (FEC is well known as discussed above). Embodiments may use various powerful FEC coding techniques, such as, but not limited to, Turbo Codes, and Low Density Parity Check Codes. Furthermore, according to other embodiments, the N=2 output orthogonal space-time code can be extended to any arbitrary number of outputs, however the code rate for these embodiments will be less than one but will not be less than one half. Furthermore, the codeword block length will be no larger than 2N. All of the desired properties described above are retained.

One skilled in the art will recognize that embodiments are not limited only to orthogonal space-time codes. Embodiments may advantageously use any space-time code so long as the number of encoder outputs corresponds to the number of beams in the coverage area. Some alternative embodiments may include non-orthogonal codes, quasi-orthogonal codes, trellis space-time codes, super-orthogonal space-time trellis-codes, turbo space-time codes, super-orthogonal space-time codes, and/or other space-time codes that provide the same number of outputs as the number of spot beams that comprise the coverage area of the spot beam broadcast satellite system.

Many of the STCs described above require knowledge of the channel gain, which is also known as channel state information (CSI). Various methods are known to the art for obtaining the CSI, such as transmitting a known pilot symbols to perform channel sounding to measure the channel gains. The known pilot symbols may be realized in various ways, including, but not limited to (a) as periodic pilot symbols multiplexed into the symbol stream on a time-division multiplexing (TDM) basis, (b) as an adjacent small bandwidth FDM carrier that transmits only a known symbol stream, or (c) as pilot signals on orthogonal PN code for use within a code division multiple access (CDMA) system. Embodiments may implement one or more of the CSI methods described herein and/or others.

According to some embodiments, a differential space-time code is employed rather than performing a channel gain estimate. A non-coherent differential STC allows decoding of the encoded signal to be performed without knowledge of channel gains. Using a differential STC eliminates the need to estimate the gain for each of the beams. However, decoding a non-coherent code may be more computationally intensive than performing a channel gain estimate as described above.

Construction and decoding techniques of the various STCs described herein are known in the art. One reference that discusses the STCs described herein is "Space-Time Coding Theory and Practice," by Hamid Jafarkhani, published by Cambridge University Press (3005) (ISBN-10:0521842913; ISBN-13: 978-0521842914). However, the application of STC in a spot beam satellite system to enable a spot beam satellite to broadcast data on the same frequency on a plurality of spot beams as described herein is novel application of STCs that provides for flexible satellite systems that may be configured to provide either broadcast and/or spot beam transmissions from the same satellite system.

According to an embodiment of the present invention, satellite system 100 may comprise a constellation of low earth orbit (LEO) satellites 110, and gateway 120 is configured to use a use all of the spot beams (or at least a subset of the spot beams) of the constellation of satellites 110 to provide coverage over fixed broadcast area. Satellites 110 are in a low earth orbit, which means that the beams move relative to the surface of the Earth, in contrast with spot beam satellites in a geosynchronous orbit where the angular velocity of the satellites match the angular velocity of the Earth and the spot beams stay in a fixed position relative to the surface of the Earth. Accordingly, the individual spot beams and the number of spot beams that provide coverage to the fixed broadcast area will vary with time. As the number of beams providing coverage to the fixed broadcast area changes, space-time encoder 300 is dynamically reconfigured, such that ST encoder module 320 produces $N_1$ outputs, each of the $N_1$ outputs corresponding to one of the $N_1$ spot beams providing coverage to the fixed broadcast area at a first point in time and ST encoder module 320 produces $N_2$ outputs, each of the $N_2$ outputs corresponding to one of the $N_2$ spot beams providing coverage to the fixed broadcast area at a second point in time.

According to another embodiment of the present invention, satellite system 110 may comprise Ka-band spot beam satellites 110. Many conventional Ka-band spot beam satellites have beams configured in 4-color or 7-color frequency reuse pattern. Adjacent beams are typically "hardwired" to operate on different frequencies to prevent adjacent beams from transmitting on the same frequency. However, according to an embodiment of the present invention, the techniques for providing broadcast services on spot beam satellites described above may be utilized on a Ka-band satellite system. The space-time encoding technique described above may be used for all beams that operate on the same frequency, and the broadcast is repeated for all frequencies at which beams of the Ka-band satellite system are operating. This technique helps to eliminates spot beam interference, but does not all of the beams to use the full bandwidth available to the satellite as in the embodiments described in FIGS. 1, 3, and 4. Furthermore, in a typical Ka-band satellite system, spot beams operating on the same frequency are generally connected to hubs in different physical locations. As a result, space-time encoding is performed at each of the hubs, but the hub uses only the STC output corresponding the hub's spot beam operating at a particular frequency. The transmissions from each of the hubs are pre-corrected so that the transmissions arrive at the satellite symbol synchronized.

While the embodiments described above may make reference to specific hardware components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A broadcast signal source for providing broadcast data input signal to a spot beam satellite broadcasting system, the broadcast signal source comprising: a space-time encoder module for encoding the single broadcast data input signal into a plurality of space-time encoded signals; and
    a transmitter configured to simultaneously transmit the plurality of space-time encoded signals to a spot beam satellite, each of the plurality of space-time encoded signals corresponding to a different one of a plurality of spot beams such that the spot beam satellite simultaneously broadcasts the space-time encoded signals using the same frequency in the plurality of spot beams to spot beam coverage areas comprising a contiguous geographical area
    wherein the spot beam satellite broadcasting system comprises a constellation of low earth orbit (LEO) satellites, provide the plurality of space-time encoded signals to a broadcast coverage area, wherein a number of the plurality of spot varies with time, and wherein the space-time encoder module dynamically updates to produce a number of the plurality of space-time encoded signals corresponding to the number of the plurality of spot beams;
    and wherein the spot beam satellite comprises a Ka-band spot beam satellite configured to transmit at a first frequency using the plurality of spot beams and to transmit at a second frequency using a second plurality of spot beams, and wherein the space-time encoder module is configured to encode the single broadcast data input signal using an orthogonal space-time code, and wherein the single broadcast data input signal is separately encoded for the plurality of spot beams and for the second plurality of spot beams.

2. The broadcast signal source of claim 1, wherein the single broadcast data input signal is space-time encoded using an orthogonal space-time code.

3. The broadcast signal source of claim 1, wherein the space-time encoder module modulates the plurality of space-time encoded signals on separate carrier signals.

4. The broadcast signal source of claim 1, wherein the space-time encoder module forward error correction (FEC) encodes the single broadcast data input signal prior to encoding the single broadcast data input signal using space-time encoding.

5. A method for broadcasting data using a spot-beam satellite system comprising:
    encoding a broadcast data input signal to provide a plurality of space-time encoded signals, wherein each of the plurality of space-time encoded signals corresponds to a different one of a plurality of spot beams of a spot-beam satellite, and
broadcasting the plurality of space-time encoded signals using the plurality of spot-beams of the spot beam satellite, wherein the plurality of space-time encoded signals are broadcast simultaneously using the same frequency in the plurality of spot beams to spot beam coverage areas comprising a contiguous geographical area
    wherein the spot beam satellite system comprises a constellation of low earth orbit (LEO) satellites that provide the plurality of space-time encoded signals to a broadcast coverage area, wherein a number of the plurality of spot beams varies with time, and wherein encoding the broadcast data input signal to provide the plurality of space-time encoded signals further comprises: encoding the single broadcast data input signal to provide a number of the plurality of space-time encoded signals corresponding to the number of the plurality of spot beams;
    and wherein the spot beam satellite comprises a Ka-band spot beam satellite configured to transmit at a first frequency using the plurality of spot beams and to transmit at a second frequency using a second plurality of spot beams, and wherein space-time encoding the single broadcast data input signal to produce the plurality of space-time encoded signals further comprises: separately encoding the broadcast data for the plurality of spot beams and for the second plurality of spot beams.

6. The method of claim 5, wherein the single broadcast data input signal is space-time encoded using an orthogonal space-time code.

7. The method of claim 5, wherein encoding the single broadcast data input signal further comprises:
    modulating the plurality of space-time encoded signals such that the plurality of space-time encoded signals transmitted on the plurality of spot beams are symbol synchronized.

8. The method of claim 7, further comprising:
    forward error correction (FEC) encoding the single broadcast data input signal prior to space-time encoding the single broadcast data input signal.

* * * * *

UNITED STATES PATENT AND TRADEMARK OFFICE
CERTIFICATE OF CORRECTION

PATENT NO.       : 8,660,481 B2
APPLICATION NO.  : 12/052339
DATED            : February 25, 2014
INVENTOR(S)      : Mark J. Miller Page 1 of 1

It is certified that error appears in the above-identified patent and that said Letters Patent is hereby corrected as shown below:

In the Claims

Claim 1, Column 9
   Line 47, Delete "geographical area" and insert
      -- "geographical area;" --

Claim 5, Column 10
   Line 28, Delete "ing a contiguous geographical area" and insert
      -- "ing a contiguous geographical area;" --

Signed and Sealed this
First Day of July, 2014

Michelle K. Lee
*Deputy Director of the United States Patent and Trademark Office*